United States Patent [19]

Marshall

[11] 4,241,272
[45] Dec. 23, 1980

[54] NOVEL LIQUID METAL CURRENT COLLECTOR CONFIGURATION

[75] Inventor: Robert A. Marshall, Schenectady, N.Y.

[73] Assignee: General Electric Company, Schenectady, N.Y.

[21] Appl. No.: 934,100

[22] Filed: Aug. 16, 1978

[51] Int. Cl.³ .......................................... H02K 13/00
[52] U.S. Cl. ...................................... 310/219; 310/178
[58] Field of Search ...................... 310/178, 219, 232; 322/48; 339/5 L, 8 L

[56] References Cited

U.S. PATENT DOCUMENTS

| T920,005 | 3/1974 | Mole | 310/178 |
|---|---|---|---|
| 3,211,936 | 10/1965 | Harvey | 310/219 |
| 4,071,795 | 1/1978 | Dobbing | 310/219 |
| 4,146,807 | 3/1979 | Hatch | 310/219 |
| 4,151,455 | 4/1979 | Janotik | 310/219 |

OTHER PUBLICATIONS

"Superconducting Machinery for Naval Ship Propulsion"; H. G. Stevens et al.; Jan. 1977.

Primary Examiner—R. Skudy
Attorney, Agent, or Firm—Nathan D. Herkamp; James C. Davis, Jr.; Paul R. Webb, II

[57] ABSTRACT

An electrical current collector for an acyclic machine employs a rotor collector ring and a stator collector surface connected by a liquid metal current collector having a limited area defined by a nonconductive enclosure for containing conductive liquid metal. Liquid metal is supplied to the enclosure by a passageway through the stator contact area having an orifice within the enclosure area. The enclosure is resiliently mounted upon the stator and spring biased toward the rotor collector ring. The liquid metal making the contact between the rotor collector ring and the stator collector area is maintained under pressure and a limited leakage between the enclosure surface and the rotor collector ring is allowed. The enclosure wall may contain permanent magnets to limit the magnetic affects upon the liquid metal in the current collectors from the excitation field.

12 Claims, 6 Drawing Figures

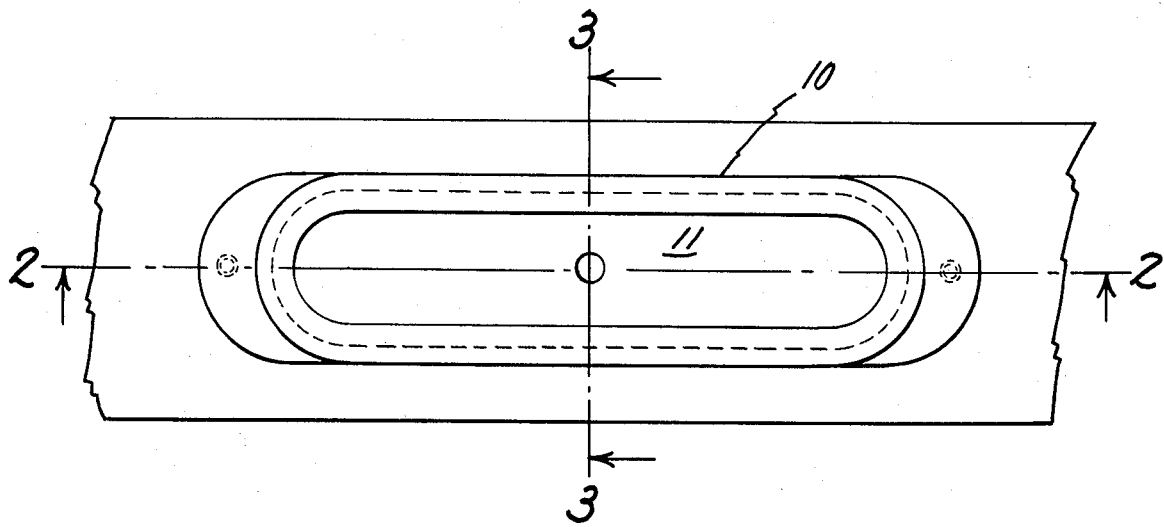
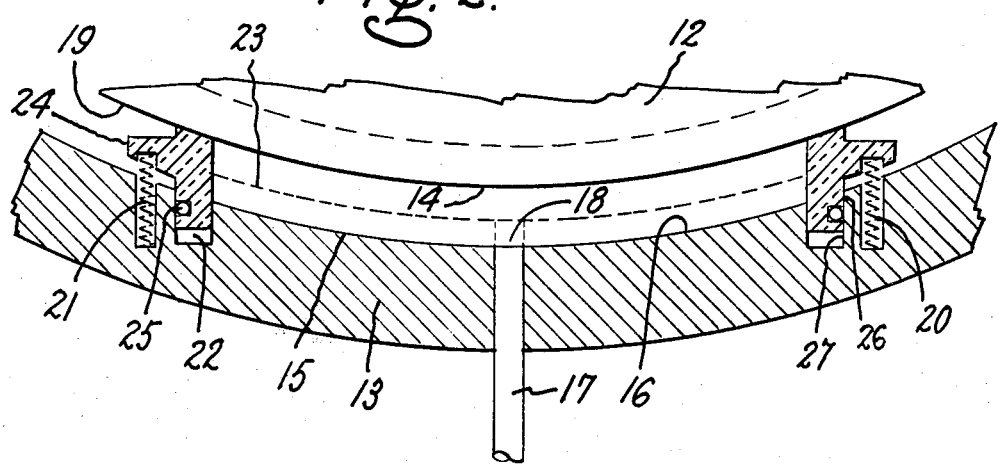
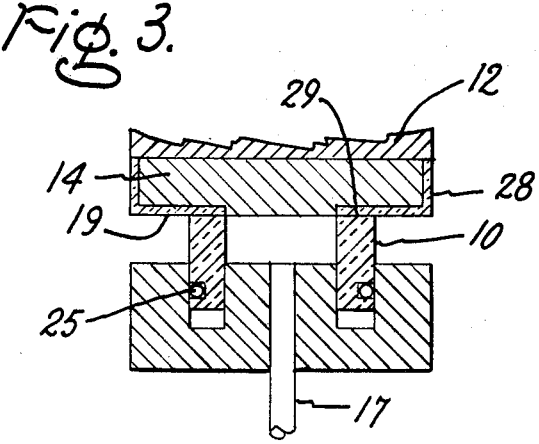

NOVEL LIQUID METAL CURRENT COLLECTOR CONFIGURATION

BACKGROUND OF THE INVENTION

This invention relates to acyclic machines employing liquid metal electrical current collectors, and more particularly to apparatus and method for providing a limited area liquid metal contact between the rotor and stator of such machines.

In acyclic machines utilizing high current density field coils, such as supercooled aluminum or copper coils cooled to the temperature of liquid nitrogen or superconducting field coils, high current-carrying capacity is required for making electrical connections between the rotor and stator. Liquid metal current collectors have been utilized for such machines due to their high current-carrying capacity.

Use of liquid metal in the current collectors results in viscous drag on the rotating rotor due to the contact with the liquid metal. By reducing the surface area of the liquid metal to rotor contact, the amount of viscous drag on the rotating rotor may be limited.

In the prior art is a technique disclosed in U.S. Pat. application Ser. No. 838,714, filed Oct. 3, 1977 by Hatch, now U.S. Pat. No. 4,146,807 and assigned to the instant assignee. In that application is disclosed a technique of limiting the rotor to liquid metal contact area by defining a narrow axial dimension and a limited circumferential dimension liquid metal contact by using a raceway-type confinement arrangement for the liquid metal current collector. The abutting raceways accommodate rotor eccentricity by shifting relative to the rotor whenever a raceway surface contacts the rotor. The frictional engagement then causes the abutting raceways to remain in the eccentric position until the rotor again contacts a raceway. Thereby, a slight variation in spacing between the raceway surface and the rotor is allowed.

Also known to me is a confinement structure as shown in FIG. 8a on page 272 of *IEEE Transactions on Magnetics*, Vol. MAG-13, No. 1, January, 1977 in an article titled "Superconducting Machinery for Naval Ship Propulsion" pp. 269-274, which utilizes an open-topped container, which rides on a layer of liquid metal between the stator and the containment device, and provides a liquid metal contact within the conductive container. This produces four liquid metal to solid metal contact surfaces and requires a substantial quantity of liquid metal to maintain each of the contact areas in complete contact.

In motor applications, such as for ship propulsion, capability of applying full torque (and overload torques) at all and any motor speeds (e.g., up to 1500 RPM) in both directions of rotation, including zero speed and emergency reversals, is required. To carry the necessary current at all modes of operation a continuous supply of liquid metal is required at each collector site. This requirement in addition to the requirement of limiting liquid metal to rotor surface area to limit viscous losses is achieved by the invention disclosed herein by containing a continuous supply of liquid metal under pressure within an enclosure at each collector site.

An additional problem experienced in utilizing liquid metal current collectors in acyclic machines is that the intense magnetic field from the field coils creates a voltage across the surfaces of the rotor collector rings in the axial direction, tending to eject the liquid metal from the collector site. If the liquid metal is allowed to be moved from the current collector site, the current collectors would run either partially dry raising the current density to a point where arc-over between the rotor and stator collector areas would occur, or entirely dry causing a break in the electrical connection. In either case, the acyclic machine would be rendered inoperative. Therefore, in one embodiment of the instant invention, permanent magnet inserts are provided in the enclosure wall to locally reduce and align the magnetic field at the collector sites, thereby allowing higher current densities to be carried by a given current collector.

Accordingly, one object of the invention is to provide a liquid metal current collector configuration which allows continuous electrical contact between a predetermined area of a stator collector in an acyclic machine and the rotor collector ring thereof.

Another object of the invention is to provide a liquid metal current collector which exhibits reduced viscous drag losses at high machine speed while providing continuous contact at all modes of machine operation.

Another object of the invention is to provide permanent magnets in the enclosure wall to reduce the magnetic effects upon the liquid metal in the current collectors.

SUMMARY OF THE INVENTION

In accordance with one embodiment of the invention, an electrical current collector for acyclic machines comprises a rotor collector ring, a stator current collector area and an enclosure encircling the stator current collector area with a liquid metal supply passage having an orifice opening into the enclosure for maintaining a continuous supply of conductive liquid metal to the enclosed area. The enclosure wall is biased with a positive pressure against the rotor collector surface and secured to the stator collector. Liquid metal is supplied to the enclosure area and limited leakage between the enclosure wall and the rotor collector surface is allowed. In accordance with another preferred embodiment of the invention, permanent magnets are inserted into the wall of the enclosure to control magnetic effects on the liquid metal within the current collector.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a schematic plan view of one embodiment of the enclosure for confining liquid metal in a liquid metal current collector of the instant invention;

FIG. 2 is a cross-sectional view taken along line 2—2 of FIG. 1;

FIG. 3 is a cross-sectional view taken along line 3—3 of FIG. 1.

MANNER AND PROCESS OF MAKING AND USING THE INVENTION

Figure 4:
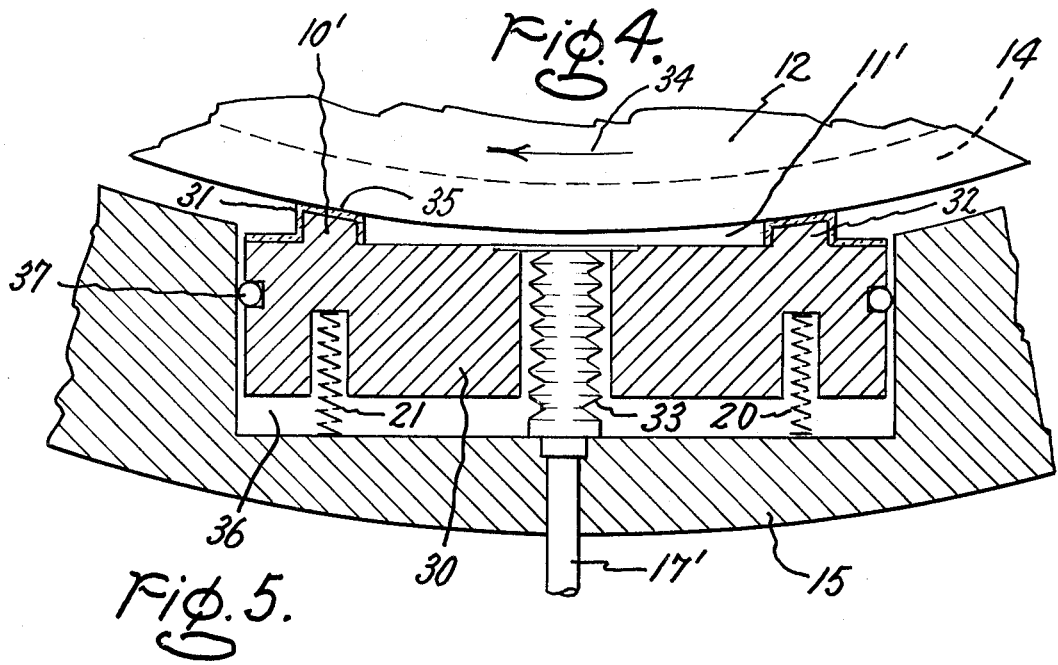
FIG. 4 is a cross-sectional view similar to FIG. 2 of a modification of the instant invention.

Disclosed herein is a current collector useful in machines of the type disclosed in U.S. Pat. No. 3,211,936 issued Oct. 12, 1965 to Harvey, and of the type disclosed in U.S. Pat. No. 3,585,398, issued June 15, 1971 to Harvey, both assigned to the instant assignee, and both of said patents incorporated herein by reference. The machine disclosed in U.S. Pat. No. 3,211,936 includes a single rotor of a drum type and a plurality of liquid metal current collectors for making electrical connections between said rotor and a stator. The machine disclosed in U.S. Pat. No. 3,585,398 includes a rotor having a plurality of rotatable disks interleaved with a plurality of fixed stator disks with liquid metal current collector making electrical connection between each pair of adjacent disks. The collector disclosed herein is capable of providing improved current carrying contact in machines of either the drum or disk type wherein an external pressurized supply of liquid metal is provided for the liquid metal current collectors.

In FIG. 1 is shown a plan view of an enclosure 10 having a racetrack shape and defining a contact area 11 for a liquid metal current collector between a rotor 12 and stator 13 of an acyclic machine. In FIG. 2 is a partial cross-sectional view of a machine having a rotor 12 with a current collector ring 14 and a stator collector 15 having a current collector contact area 16 surrounded by an enclosure 10 of the instant invention. Within the stator collector area 11 is a passage 17 for supplying conductive liquid metal, such as sodium potassium eutectic (NaK) or other conductive liquid metal, from a source (not shown) having an orifice 18 opening into the enclosed contact area 11 for continuously supplying liquid metal to the current collector site. A plurality of supply passages 17 and orifices 18 could be provided if desired.

The rotor collector ring 14 and stator collector surface 15 are made of copper or similar highly conductive metal. The enclosure wall 10 is made of nonconductive material such as a ceramic or other nonconductive containment material.

As shown in FIG. 2, the enclosure wall 10 is spring biased toward the rotor collector ring surface 19 by coil springs 20 and 21. The enclosure wall 10 fits into a mating notch 22 in the stator collector 15, and a portion of the stator collector 15 within the enclosure wall 10 defines a stator collector area 11. The area 11 may be raised as shown in phantom at 23 on FIG. 2. The springs 20 and 21 are attached to an extension 24 of the enclosure wall 10. A seal 25 is provided between the enclosure wall surface 26 and the surface 27 of the notch 22 into which it fits within the stator collector 15. This prevents leakage of the liquid metal from the stator enclosure wall/notch interface. If the machine were operated at a low liquid metal pressure, the seal would be unnecessary since leakage would be limited by the pressure of the liquid metal supply.

The upper surface of the enclosure wall 10 is curved in the embodiment shown in FIG. 2 to a complementary arcuate shape with the rotor collector ring surface 19. This provides a close contour between the enclosure wall 10 and the rotor surface 19 so that with reasonable spring pressure on springs 20 and 21 leakage of liquid metal between the wall 10 and the rotor collector ring surface 19 is limited to an acceptable amount. By maintaining adequate liquid metal supply pressure to provide for a continuous slow leakage of liquid metal over the edge of the enclosure wall 10, an adequate supply of liquid metal is ensured to maintain continuous contact over the entire surface of the liquid metal to rotor collector ring contact area 11 and to reduce friction between the relatively rotating parts. The flexible mounting of the enclosure wall 10 by the springs 20 and 21 allows the enclosure wall 10 to follow the contour of the rotor collector ring surface 19 as it rotates past the enclosure wall 10, thereby maintaining a constant contact area between the rotor collector ring surface 19 and the liquid metal contained within enclosure wall 10.

As shown in FIG. 3, the rotor contact ring 12 is coated with a layer 28 of nonconductive material such as polished alumina to provide a high resistance, low friction contact for the interface between the rotor contact ring 12 and the enclosure wall surface 29. Thereby, a surface having a low coefficient of friction may be maintained between the enclosure wall surface 29 and the rotating rotor collector ring surface 19, so that contact between the two surfaces caused by the biasing springs 20 and 21 will not damage either surface or add significantly to machine inefficiencies. Liquid metal which escapes through the rotor to enclosure interface will be collected in a sump (not shown) and circulated back to a liquid metal source and pump (not shown).

An alternate embodiment of the instant invention is shown in FIG. 4. In that embodiment a metallic electrically conductive contact 30 is located between the stator collector 15 and the rotor collector ring 14. The metallic contact 30 is spring biased toward the rotor collector ring 14 by the springs 20 and 21. A ceramic coating 31 surrounds an upper projection 32 on the contact 30 to prevent electrical current from flowing directly from the rotor collector ring 14 to the contact 30. A liquid metal supply passage 17' is provided through the stator collector 15 and through a bellows structure 33 welded to the stator collector 15 and the conductive contact 30. The rotor 12 rotates in a direction shown by arrow 34, and liquid metal is supplied to the enclosure 10' formed by the projection 32 on the copper contact 30 through the feed passage 17' and the bellows 33 to make electrical contact between the rotating rotor collector ring 14 and the stator collector 15. Electrical connection between contact 30 and stator collector 15 could be provided by bellows 33 or a plurality of flexible metal connections (not shown) welded to the contact 30 and the stator collector 15. In this embodiment liquid metal escapes from the enclosed area 11' between the rotor collector ring 14 and the surface 35 of enclosure 10' is collected in a sump and circulated back to the liquid metal source and pump. Entry of the liquid metal into the space 36 between stator collector 15 and contact 30 interface is prevented by an O-ring seal 37.

In operation of the invention, highly conductive liquid metal such as mercury or sodium-potassium eutectic is supplied through the passage 17 to the enclosed contact area 11. By this method regardless of machine speed or direction of rotation an adequate supply of liquid metal is provided to maintain the high density current carrying capacity required for high efficiency acyclic machines.

Figure 6:
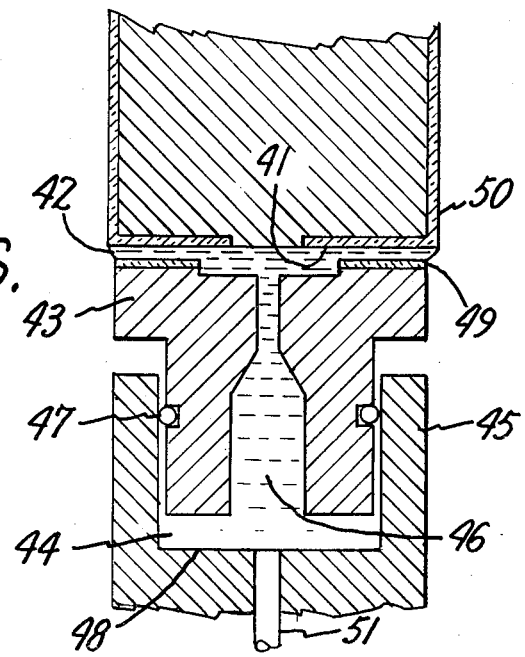
FIG. 6 is a schematic view of a prior art device for confining liquid metal in a liquid metal current collector.

In the prior art, liquid metal containment at collector sites is provided by a contact "button" as described in the *IEEE Transactions on Magnetics* article referred to above, and illustrated in FIG. 6. As shown in FIG. 6 a liquid metal layer 42 is located between rotor surface 41 and conductive contact button 43, usually made of copper. The stator has a collector area 48 surrounded by a sleeve 45 which also surrounds button 43 and liquid metal layer 44 which supports button 43. Escape of liquid metal between button 43 and sleeve 45 is prevented by O-ring 47. Ceramic insulating layers 49 and 50 prevent electrical current from passing through the outer part of the button/rotor interface.

Liquid metal is supplied under pressure through passage 51 to layer 44, through passage 46 to layer 42. Liquid metal is allowed to escape slowly from the rotor/contact button interface. Current passes from stator collector 48 through liquid metal layer 44 contact button 43 and liquid metal layer 42. Since the current traverses four liquid metal to solid metal interfaces, the contact loss includes four times the liquid metal/solid metal loss.

By the device and method disclosed herein I have provided a liquid metal current collector having a limited contact area between liquid metal and the moving rotor, and requiring only two liquid metal to solid metal interfaces. Thereby, a reliable liquid metal contact configuration is provided which significantly reduces the contact inefficiency of the machine. The instant invention, further, requires a lesser quantity of liquid metal than does the prior art device described above.

Figure 5:
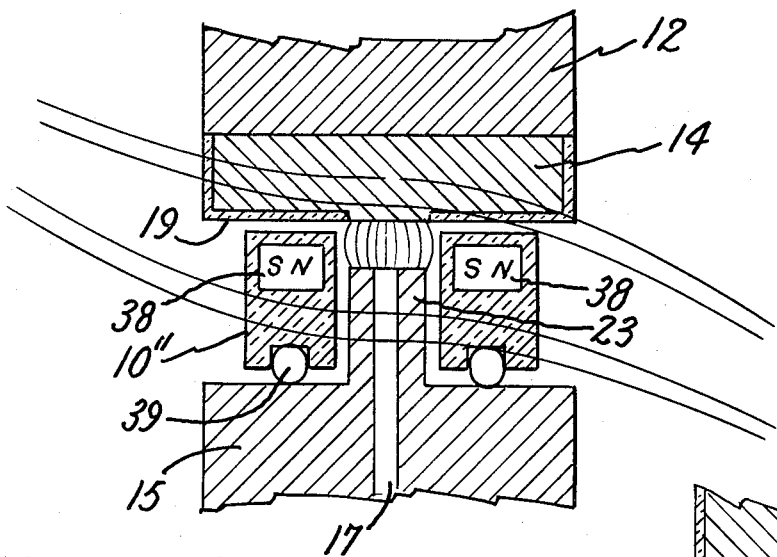
FIG. 5 is a view similar to FIG. 3 showing an alternate preferred embodiment of the instant invention.

A modification of the embodiment shown in FIGS. 1-3 is shown in FIG. 5. In the embodiment of FIG. 5 in addition to the features of the invention illustrated in FIGS. 1-3 magnets 38 are contained within the enclosure wall 10". An O-ring 39 is provided between the stator collector 15 and the enclosure wall 10", which serves the dual function of biasing the enclosure wall 10" toward the rotor collector surface 19 and sealing the enclosure area from liquid metal leakage between the stator collector 15 and enclosure wall 10". A raised area 23 is shown on collector 15 to narrow the liquid metal layer, but the collector could alternatively have a flat surface.

The magnetic inserts 38 could be high coercive force samarium cobalt permanent magnets or other magnetic material or electromagnets suitable to the type of machine and magnetic field generated by the excitation coils. These magnets 38 provide local alignment and reduction of the magnetic fields affecting the liquid metal in the collector site. As shown by the flux lines 40 passing near the liquid metal collector site, the magnets 38 align and reduce the magnetic field passing through the liquid metal connection area between the rotor and stator collector surfaces. This reduces the magnetic effect upon the liquid metal, which tends to reduce the current carrying capacity of the liquid metal current collectors.

In most machines, at most current collector sites, the magnetic flux is generally angled from the axial direction at the collector site. Therefore, an unequal quantity of magnetic flux passes through adjacent increments of the rotor and stator contact areas. This creates a differential potential between adjacent increments of the liquid metal to solid metal contact areas. This potential difference causes circulating current to flow in the collector area adding electrical losses to the machine. By utilizing the magnets in the arrangement shown in FIG. 5, this magnetic interference with the conductive liquid metal at the current collectors is reduced.

An alternative method used in the prior art to align the collector surfaces with the magnetic flux passing through the collector site has been to machine the rotor and stator collector surfaces into alignment with the expected magnetic flux orientation at the collector site. See, for example, application Ser. No. 876,570, filed Feb. 10, 1978 by Hatch, now U.S. Pat. No. 4,168,446 and assigned to the instant assignee. This requires precision machining of the rotor tip surfaces and adds substantially to the manufacturing cost by requiring exceptionally close tolerances on the machining of the rotor and stator parts for acyclic machines. It is known that precision machining of rotor and stator collector parts to a high accuracy in the radial direction is relatively less expensive than similar machining for angled surfaces. Assembly of rotor and stator parts is facilitated by having all radial surfaces cylindrically uniform.

A further advantage of the assembly shown in FIG. 5 is that magnets need only be used at the collector sites. This limits the amount of magnetic material necessary to control the magnetic fields at the current collectors and the number of assembly steps required to produce the machine.

A plurality of current collectors as described herein could be provided around the circumference of a rotor collector ring to provide adequate cross-sectional area between the rotor collector ring and the stator collector to carry the maximum current required for operation of the machine. This would include capacity to carry the design fault in all modes of machine operation. Since the liquid metal is supplied independently of machine operation, adequate current carrying capacity is provided whether the machine is rotating forward or in the reverse sense or is in the stopped condition. The cross-sectional area of the current collectors is maintained at the full contact area between the liquid metal and the rotor collector rings at the collector sites in all modes of operation. By selecting the number of current collectors, the required current carrying capacity can be provided with a minimum of liquid metal. This limits the handling of liquid metal to the minimum required for the machine operation and reduces the viscous losses caused by the rotor collector ring moving through a contact area with the liquid metal. Since viscous losses are substantial at high speed operation, the instant invention is particularly advantageous in high speed generators (e.g., generators with operating speeds up to 10,000 RPM) or high speed motors (e.g., motors with operating speeds up to 1500 RPM).

BEST MODE

The best mode contemplated by me includes a containment enclosure 10 spring biased toward the rotor collector of ceramic material having samarium cobalt permanent magnets 38 located within the enclosure wall. A pressurized supply of NaK maintains the enclosure filled with liquid metal.

The collector device as disclosed herein provides continuous, reliable, single layer liquid metal contact between the rotor and stator of an acyclic machine, while requiring only a small amount of conductive liquid metal, thereby reducing viscous drag on the machine and electrical losses in the current collector.

While preferred features and the best mode of the invention have been shown, many modifications and changes will occur to those skilled in the art. It is, therefore, to be understood that the appended claims are intended to cover all such modifications and changes as fall within the true spirit of the invention.

I claim:

1. In an electrodynamic machine wherein a liquid metal current collector provides electrical connection between a fixed stator and a rotatable rotor, said liquid metal current collector being disposed in a gap between said stator and said rotor to provide electrical connection between a rotor collector ring and a stator collector, the improvement comprising: a nonconductive enclosure movably supported on said stator collector extending into said gap for containing a volume of liquid metal therein; means for resiliently biasing said enclosure against a surface of said rotor collector ring adjacent said enclosure, such that one surface of said enclosure is in contact with said surface of said rotor collector ring over substantially the entire area of said one enclosure surface; a source of supply of liquid metal in flow communication with the interior of said enclosure; and means for supplying a flow of liquid metal from said source under pressure to the interior of said enclosure to maintain said enclosure filled with liquid metal.

2. The device of claim 1 wherein the surface of said enclosure adjacent said rotor is of arcuate shape complementary to the rotor collector ring surface.

3. The device of claim 1 wherein the enclosure is shaped as a racetrack surrounding an orifice of said supply passage.

4. The device of claim 1 wherein magnets are located within said enclosure wall.

5. The device of claim 4 wherein the magnets are permanent magnets.

6. The device of claim 5 wherein the magnets are samarium cobalt magnets.

7. The device of claim 6 wherein said rotor collector ring includes a layer of polished alumina disposed on the axially outer edge of the radially outer circumference thereof such that said one enclosure surface contacts said layer.

8. In an electrodynamic machine wherein a liquid metal current collector provides electrical connection between a fixed stator and a rotatable rotor, said liquid metal collector being disposed in a gap between said stator and said rotor, for making electrical connection between a rotor collector ring and a stator collector, the improvement comprising:
a conductive contact element movably mounted on said stator collector having a protrusion extending into said gap defining an enclosure for containing a volume of liquid metal therein; said volume of liquid metal being in contact with the adjacent surface of said rotor collector ring, said protrusion being coated by a layer of electrically insulating material;
means for resiliently biasing said contact element against a surface of said rotor collector ring such that one surface of said protrusion is maintained in resilient contact with said rotor collector ring over substantially the entire area of said one surface of said protrusion;
a source of supply of conductive liquid metal in flow communication with the interior of said enclosure;
a passage through said stator collector and said contact and an electrically conductive flexible bellows passing through said passage in said contact attached to said stator collector and the opening of said passage in said contact within said enclosure; and
means to supply said liquid metal under pressure from said source of supply through said passage and bellows to the interior of said enclosure to maintain said enclosure filled with liquid metal.

9. A method of continuously supplying an electrically-conductive liquid metal to a liquid metal current collector located between a rotor collector ring and a stator collector of an acyclic machine comprising:
supplying electrically conductive liquid metal under pressure through a passage in a stator current collector to an area surrounding an outlet of said passage in a region of a current collector located between said stator collector and said rotor current collector ring, said area defined by an electrically-nonconductive enclosure, said enclosure being flexibly mounted on said stator collector and spring biased against said rotor current collector to follow the contour of the surface of the relatively rotating rotor.

10. The method of claim 9 further comprising magnetically deflecting the magnetic flux from the excitation field coils of said acyclic machine by magnets located within said enclosure to reduce the magnetic field affecting the liquid metal in the current collector.

11. The method of claim 9 further comprising pressurizing said liquid metal from said supply to such an extent that a small amount of leakage between the enclosure and said rotor collector ring escapes into the gap between the rotor and stator and is collected in a sump and returned to said source of supply.

12. The method of claim 9 wherein the liquid metal is sodium potassium eutectic.

* * * * *